United States Patent
Sun

(10) Patent No.: US 6,573,627 B2
(45) Date of Patent: Jun. 3, 2003

(54) DC BRUSHLESS VOICE-COIL VIBRATION MOTOR

(75) Inventor: Chien-Chung Sun, Taipei (TW)

(73) Assignee: Risun Expanse Corp., Taipei (TW)

( * ) Notice: Subject to any disclaimer, the term of this patent is extended or adjusted under 35 U.S.C. 154(b) by 28 days.

(21) Appl. No.: 09/884,959

(22) Filed: Jun. 21, 2001

(65) Prior Publication Data

US 2002/0195890 A1 Dec. 26, 2002

(51) Int. Cl.[7] .................................................. H02K 7/06
(52) U.S. Cl. .......................................... 310/81; 310/268
(58) Field of Search ................. 310/81, 156.32–156.34, 310/67 R, 216–218, 268, 254, 258, 259

(56) References Cited

U.S. PATENT DOCUMENTS

| | | | | |
|---|---|---|---|---|
| 4,704,566 A | * | 11/1987 | Hirano et al. ............... | 318/254 |
| 4,891,537 A | * | 1/1990 | Shiraki et al. ............ | 310/68 B |
| 5,751,085 A | * | 5/1998 | Hayashi ........................ | 310/90 |
| 5,793,133 A | * | 8/1998 | Shiraki et al. ................ | 310/81 |

* cited by examiner

*Primary Examiner*—Thanh Lam
(74) *Attorney, Agent, or Firm*—Birch, Stewart, Kolasch & Birch, LLP

(57) ABSTRACT

A DC brushless voice-coil vibration motor, especially a small-sized micro-vibration motor that utilizes inductance coils and a weight object with a plurality of coplanar magnetic poles as the stator and rotor of the motor. The invention comprises a circuit board, at least two inductance coils and a weight object. The weight object is installed on the inductance coil and away from the motor center. It has a plurality of magnetic poles as the rotor of the motor. When current flows through the inductance coil, a magnetic field is generated so that the weight object starts to rotate under the electromagnetic interactions. Since the weight object is off the motor center, the motor gains vibrational energy during the rotation of the weight object.

13 Claims, 8 Drawing Sheets

DC BRUSHLESS VOICE-COIL VIBRATION MOTOR

BACKGROUND OF THE INVENTION

1. Field of Invention

The invention relates to a DC brushless voice-coil vibration motor. By changing the designs of the stator and rotor in a motor, a miniaturized DC brushless voice-coil vibration motor can gain vibrational energy by having the rotor installed off the motor center.

2. Related Art

The mobile phone can provide on-to-one distant communication. Due to its small volume and light weight, it has become one of the most popular high-tech electronics of the century.

Usually, notifying the user incoming messages can be achieved by two methods: the ring-on mode and the vibration mode. In the ring-on mode, the mobile phone turns on ring or music when there is an incoming message. In the vibration mode, a vibration motor installed in the mobile phone starts to vibrate when an incoming message is received so that the user can feel the vibration of the mobile and answer the phone call.

The currently available vibration motor is shown in, for example, FIG. 1. The vibration motor has a cylindrical shape with a weight attached to the motor axis. When the motor rotates, the weight also rotates to generate vibrational energy. However, as the electronics such as notebook computers, PDA's (Personal Digital Assistant), mobile phones become lighter, thinner, shorter and smaller, the volume occupied by the conventional vibration motor greatly limits the designs of these high-tech electronics.

To minimize all electronic components in the vibration motor will be ideally an attempt to decrease its volume. Nevertheless, such an idea is not feasible because there might be difficulty in assembly after the miniaturization. Such limitations render the problems that are bound to be encountered after the miniaturization of the motor. Even if the assembly is possible, the difficulty in assembly may increase the cost.

Furthermore, the vibration is generated by attaching a weight to one end of the motor axis. Therefore, the dimensions of the weight object define the size of motor. As shown in FIG. 1, the weight is situated on one side of the motor, the part that generates vibrational energy is just ¼ of the whole motor. The vibration is thus local but not global. The motor has to output a larger power so as to rotate the weight and thereby increasing unnecessary power consumption. Since the weight object is fixed on the motor axis, the output vibration efficiency is also fixed. So one has to use different motors on different models of electronics in order to generate desired vibration.

SUMMARY OF THE INVENTION

In view of the foregoing, the invention provides a miniaturized DC brushless voice-coil vibration motor. It mainly consists of a circuit board, at least two inductance coils, a weight object, a controller and at least two magnetic bolts. The inductance coils are installed on the circuit board by winding around in the radial direction and is electrically connected to the power input port on the circuit board. The magnetic bolts are situated between the two inductance coils. The weight object is installed on the inductance coils, slightly off the motor center. It is a permanent magnet with a plurality of coplanar magnetic poles. The controller installed on the circuit board between the two inductance coils functions to change the magnetic properties of the inductance coils, determining whether the motor is on or off. When current pass through the inductance coils and generates a magnetic field, the magnetic bolts disturb the static balance of the magnetic field inside the motor. Under the electromagnetic interactions between the inductance coils and the weight object, the weight object rotates and gains rotational energy. Since the weight object is displaced off the motor center, the rotational energy of the weight object turns into vibrational energy of the motor.

The weight object functions as the rotor inside the motor and generates vibrational energy so that the motor can generate vibrational energy in all directions. It lowers the power consumption when starting the motor and increases the operational efficiency of the vibrational motor.

The weight object in the invention can have different displacements from the motor center to generate different vibration levels for different models of electronics.

BRIEF DESCRIPTION OF THE DRAWINGS

The present invention will become fully understood from the detailed description given hereinbelow for illustration only, and thus are not limitative of the present invention, and wherein.

DETAILED DESCRIPTION OF THE INVENTION

Figure 1:
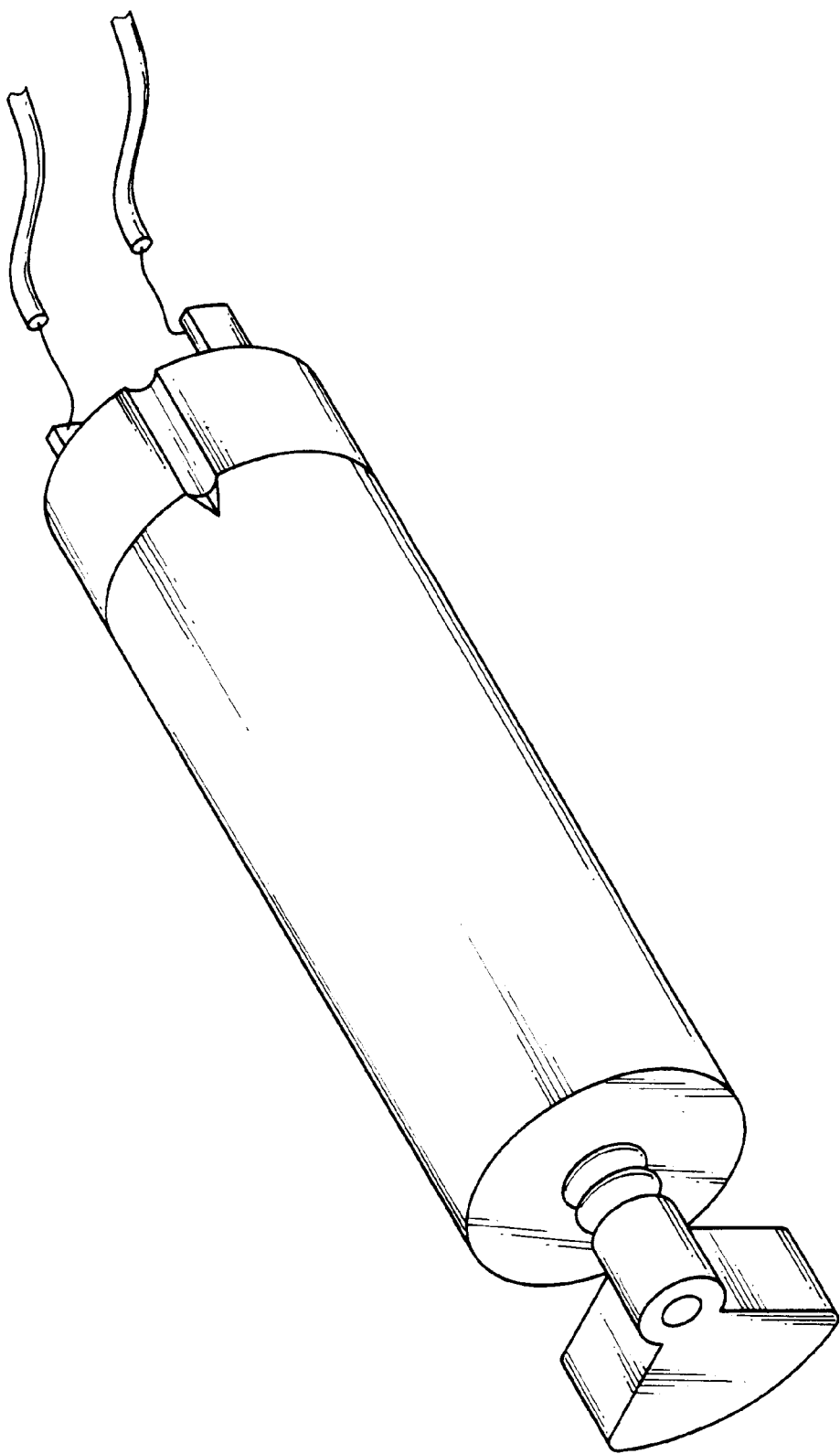
FIG. 1 is a schematic view of a traditional vibrational motor.
Figure 2:
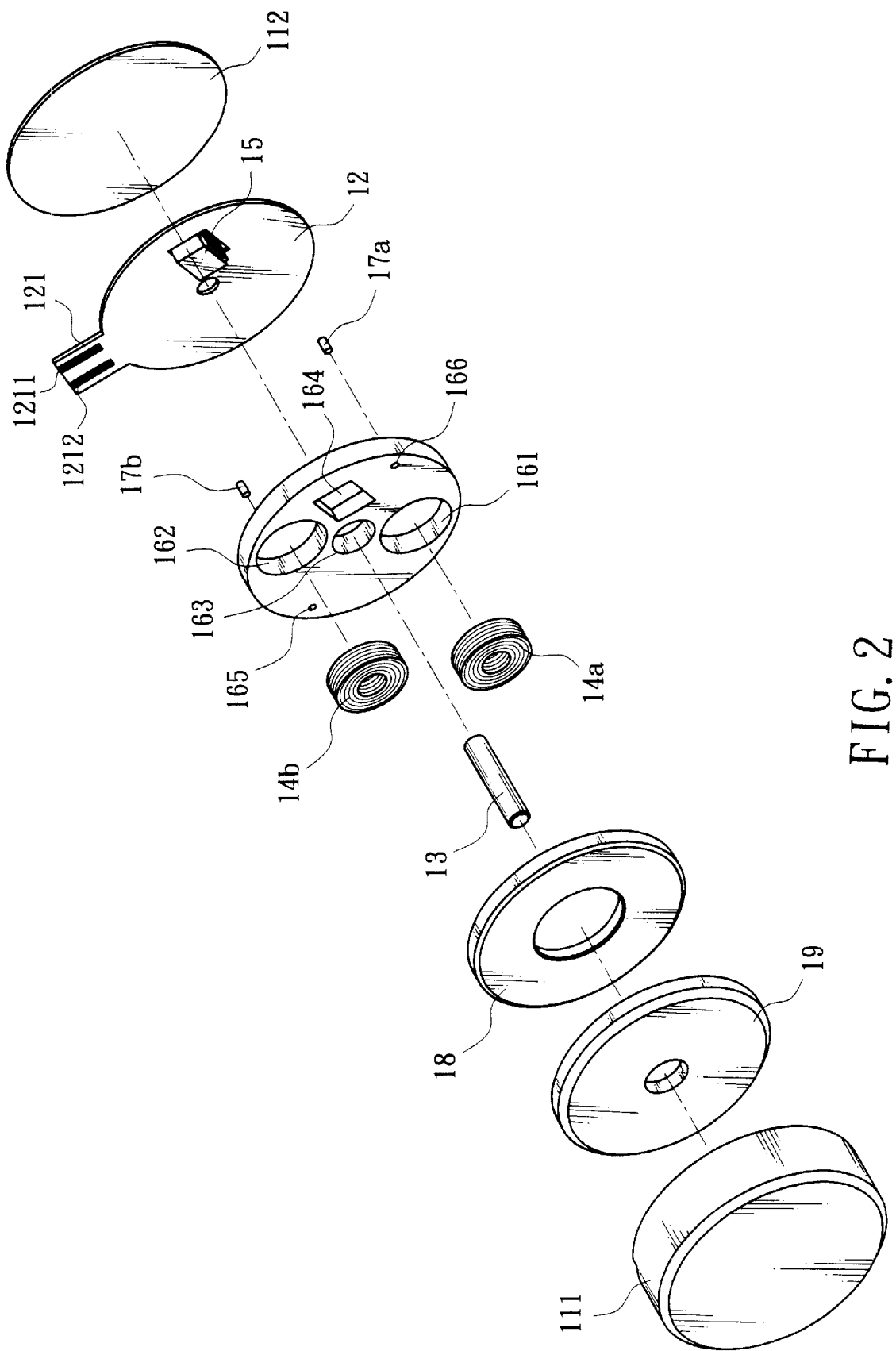
FIG. 2 is a three-dimensional exploded view of the invention.
Figure 3:
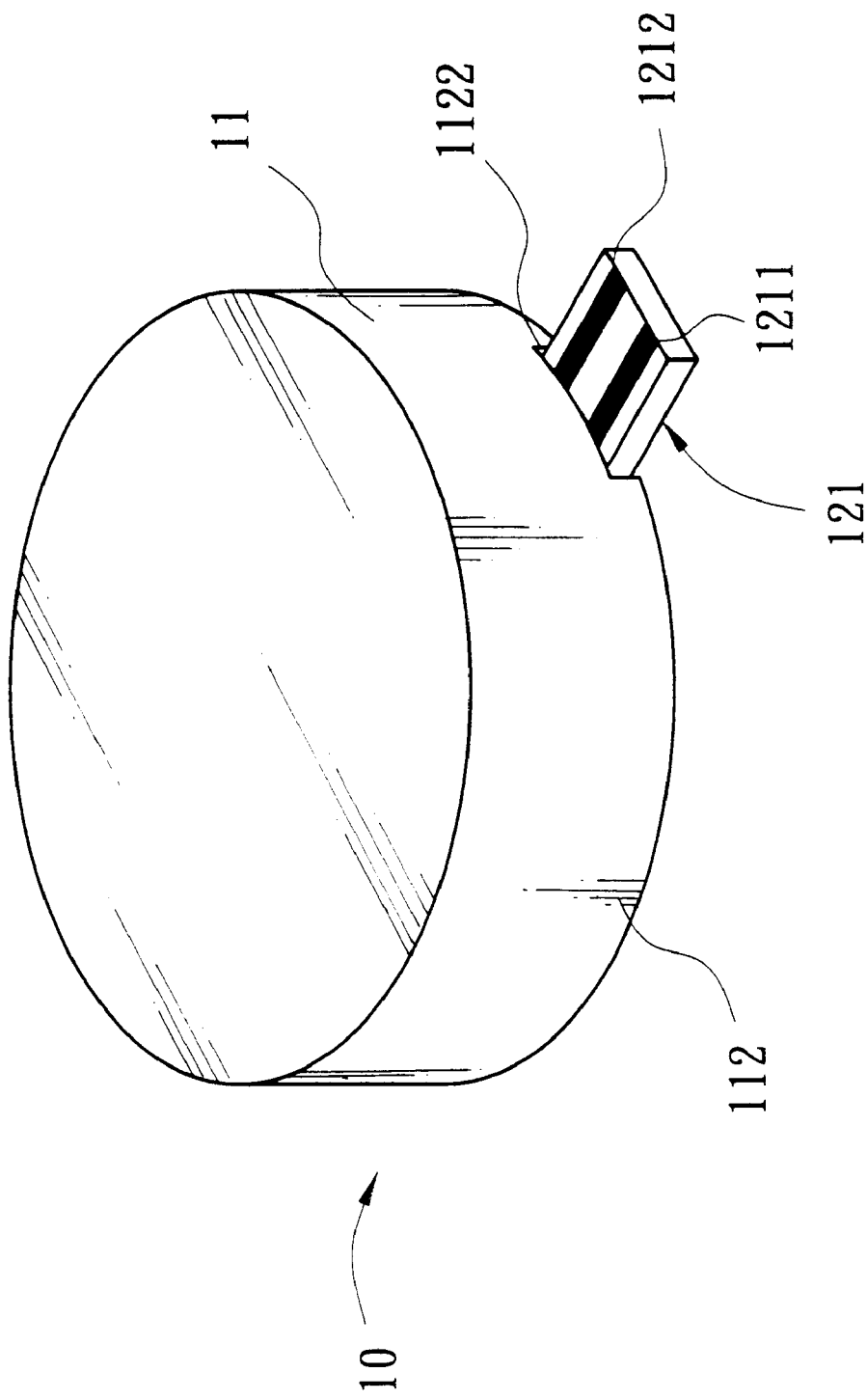
FIG. 3 is a three-dimensional perspective of an assembled embodiment.

With reference to FIGS. 2 and 3, the disclosed DC brushless voice-coil vibration motor 10 includes a shell 11, a circuit board 12, a shaft 13, two inductance coils 14a, 14b, a controller 15, a protective ring 16, two magnetic bolts 17a, 17b, and a weight object 18. The shell 11 covers the other components in the DC brushless voice-coil vibration motor 10 and is an ellipsoid comprised of a base 111 and a top cover 112. Since the DC brushless sonic vibration motor 10 uses electrical power to generate magnetic energy which then converts into mechanical energy, the shell 11 therefore has to be made of a non-magnetic material such as aluminum, nickel, copper or plastic, avoiding disturbinging the inductance magnetic field in the motor 10. An opening 1122 is formed at the bottom of the side surface of the top cover 112.

The circuit board 12, the shaft 13, the inductance coils 14a, 14b, the controller 15, the protective ring 16, the two magnetic bolts 17a, 17b, and a magnetic device 18 are installed from bottom to top inside the shell 11. The circuit board 12 is a print circuit board with a print circuit on it.

Figure 6:
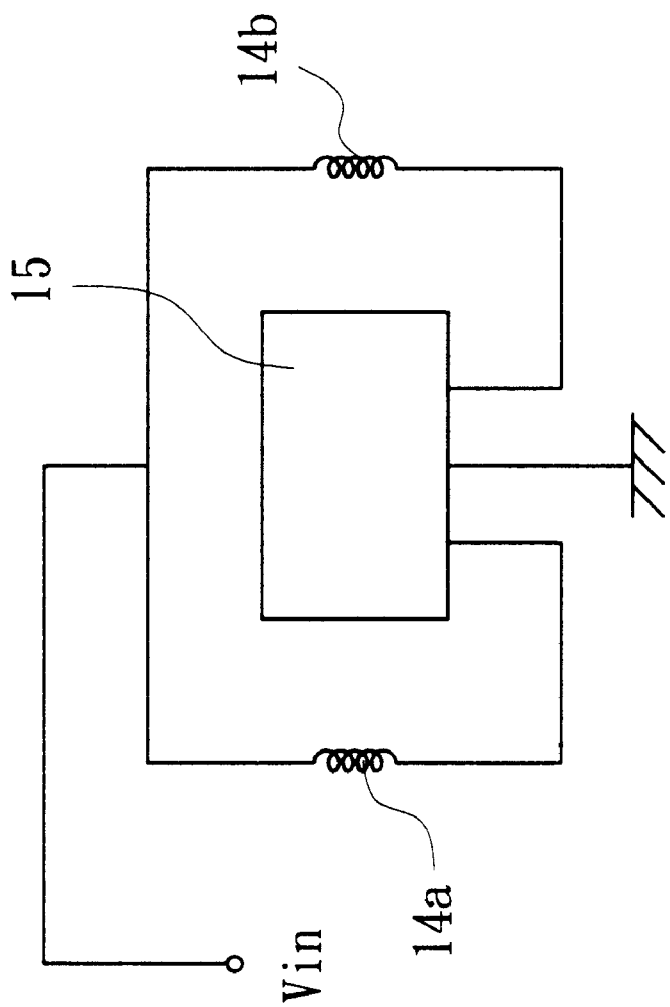
FIG. 6 is a schematic view of the main circuit of the invention.

Since most electrical properties (e.g., changing current direction and driving magnetic interactions) in the motor 10 are designed to be controlled by the controller 15, the print circuit on the print circuit board 12 will not be too complicated to implement (see FIG. 6 for a schematic view of the main circuit). Thus, the manufacturing cost can be lowered. The circuit board 12 is installed inside the shell 11 and is therefore circular with an electrical port 121 protruded from one side. Power input points 1211, 1212 are provided on the electrical port 121. An external power source (not shown) connects to the power input points 1211, 1212 to provide the power needed for the motor operation. The electrical port 121 extends outside the shell 11 from the side opening 1122 of the top cover 112 in order to connect to the external power source. The shaft 13 is installed at the center of the circuit board 12.

The two inductance coils 14a, 14b are formed by winding conductive wires in the radial direction and installed on opposite sides of the circuit 12, with electrical connection to the print circuit on the circuit board 12 (FIG. 6). They function as the stators in the motor 10. According to the Ampere's right-hand rule, if the electrical current is in the radial direction, the magnetic filed is in the axial direction. Thus, when a current flows through the inductance coils 14a, 14b, they generate a magnetic field in the axial direction.

The controller 15 is a micro-processing IC installed on the circuit board 12 with electrical connection to the print circuit (FIG. 6). The controller 15 integrates the components for most of the necessary electrical properties (e.g., changing the current direction and driving magnetic interactions) for the motor 10, thereby controlling the vibration of the motor 10. The main purpose of this design is to simplify the electrical components needed by the circuit inside the motor 10. The print circuit on the circuit board 12 can thus be simplified, which is most convenient for the assembly of miniaturized DC brushless voice-coil vibration motor 10.

The protective ring 16 is made of non-magnetic material such as plastic so as to avoid disturbing the magnetic field inside the motor 10. It has a first through hole 161 and a second through hole 162 corresponding to the inductance coils 14a, 14b, respectively, a third through hole 163 at the motor center corresponding to the shaft 13, a fourth through hole 164 corresponding to the controller 15, and a fifth through hole 165 and a sixth through hole 166 formed between the first through hole 161 and the second through hole 162. The height of the protective ring 16 is equal to the size of the inductance coils 14a, 14b. The inner diameter of the first through hole 161 and the second through hole 162 is equal to the coil diameter of the inductance coils 14a, 14b. The protective ring 16 is installed on the circuit board 12. The shaft 13 penetrates through the third through hole 163. The inductance coils 14a, 14b are installed inside the first through hole 161 and the second through hole 162, respectively. The controller 15 is installed on the fourth through hole 164. Installing inductance coils 14a, 14b inside the first through hole 161 and the second through hole 162 keeps the winding pattern of the inductance coils 14a, 14b unchanged. The magnetic bolts 17a, 17b are installed inside the fifth through hole 165 and the sixth through hole 166, respectively.

The magnetic bolts 17a, 17b are made of ferromagnetic material, such as iron. They are made into cylindrical shapes that exactly fit into the fifth through hole 165 and the sixth through hole 166.

Figure 7:
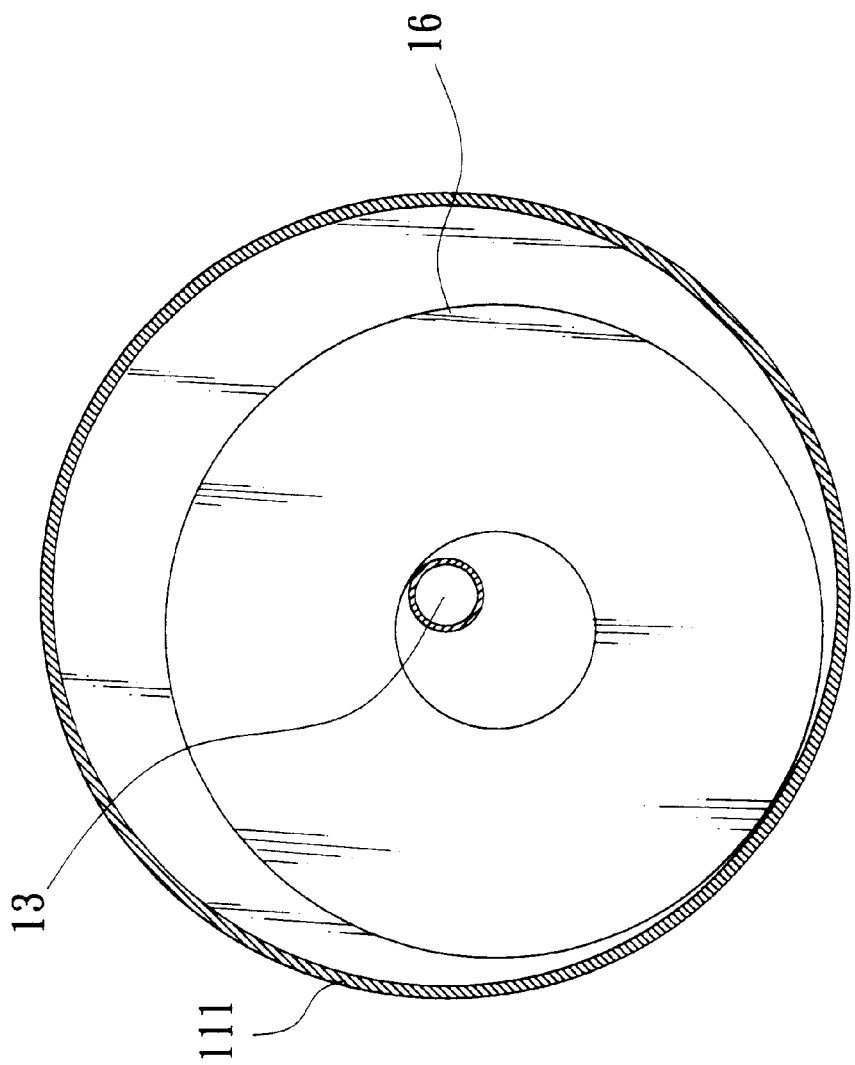
FIGS. 7 and 8 are schematic views showing the relation between the magnetic weight object and the sleeve.

The weight object 18 is a permanent magnet in a disk shape. A plurality of magnetic poles 181, 182, 183, 184 is formed on separate areas within the same plane (FIG. 4) as the rotors of the motor 10. The two adjacent poles have opposite magnetic properties (one being an N pole and the other an S pole). The magnetic lines of the magnetic poles 181, 182, 183, 184 are axial, acting on the inductance coils 14a, 14b. When the inductance coils 14a, 14b generate magnetic forces, the weight object 18 repels from the inductance coils 14a, 14b to rotate. A magnetic sleeve 19 is attached to the weight object 18 by the magnetic attraction. It is attached to the top of the weight object 18 and rotates along with the weight object, avoiding the generation of friction due to direct contact between the weight object 18 and the shell 11. To generate vibration, the weight object 18 is installed eccentric to the center of the sleeve 19. That is, the center of the sleeve 19 and the center of the weight object 18 are not on the same axis (FIG. 7). Therefore, vibration can be induced during the rotation of the weight object 18.

Figure 4:
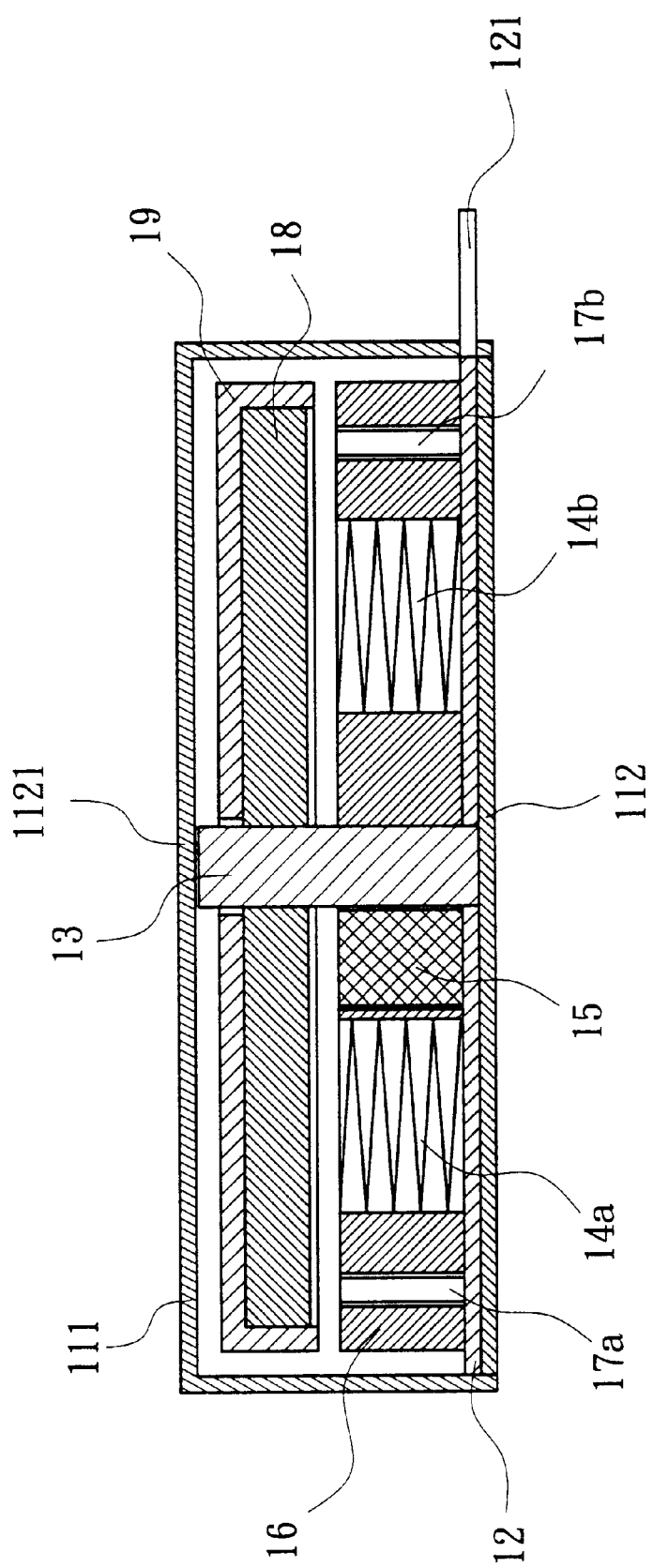
FIG. 4 is a side cross-sectional view of an assembled embodiment.
Figure 5:
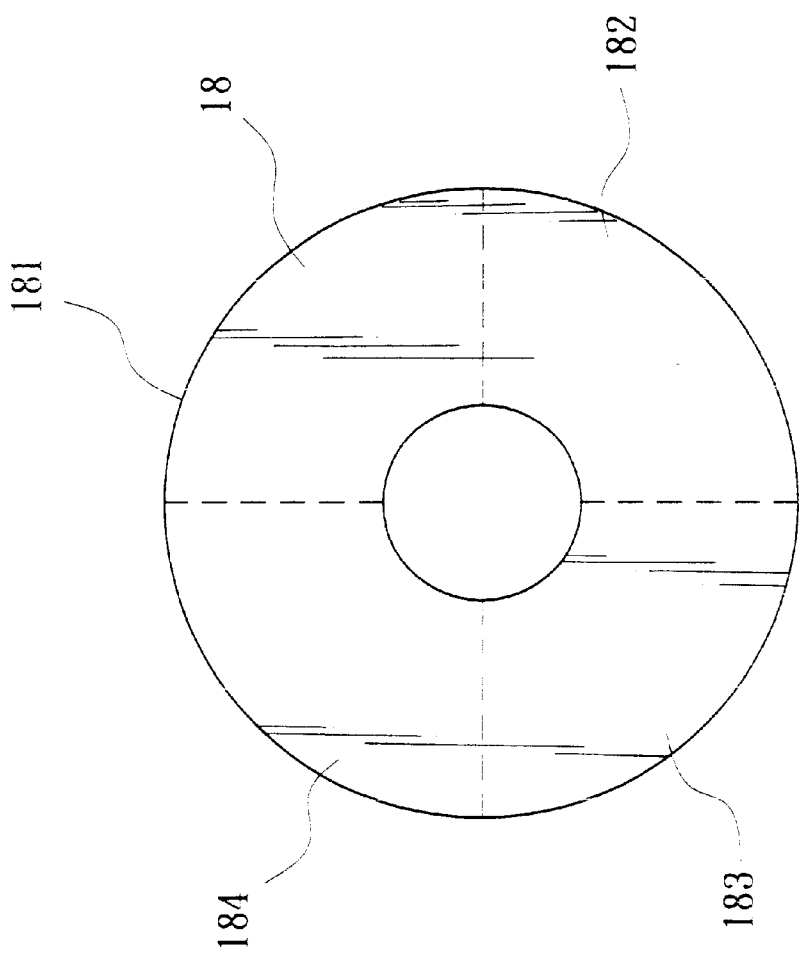
FIG. 5 is a schematic view of the magnetic poles on the magnetic weight object.

With reference to FIGS. 4 and 6, the external power source connects to the power input points 1211, 1212, which then connect to the inductance coils 14a, 14b. The inductance coils 14a, 14b are also in electrical connection with the controller 15 to form a close electrical loop. The weight object 18 are magnetically coupled with the magnetic bolts 17a, 17b so that the magnetic bolts 17a, 17b become temporary magnetic bolts. When the external power generates current through the power input points 1211, 1212, the current flows through the inductance coils 14a, 14b to generate a magnetic field. The magnetic bolts 17a, 17b disturb the static balance of the magnetic field. The inductance coils 14a, 14b repel from the weight object 18 so that the weight object 18 begins to rotate. Due to the fact that the weight object is off the motor center, the rotational energy is converted into vibrational energy of the motor.

Figure 8:
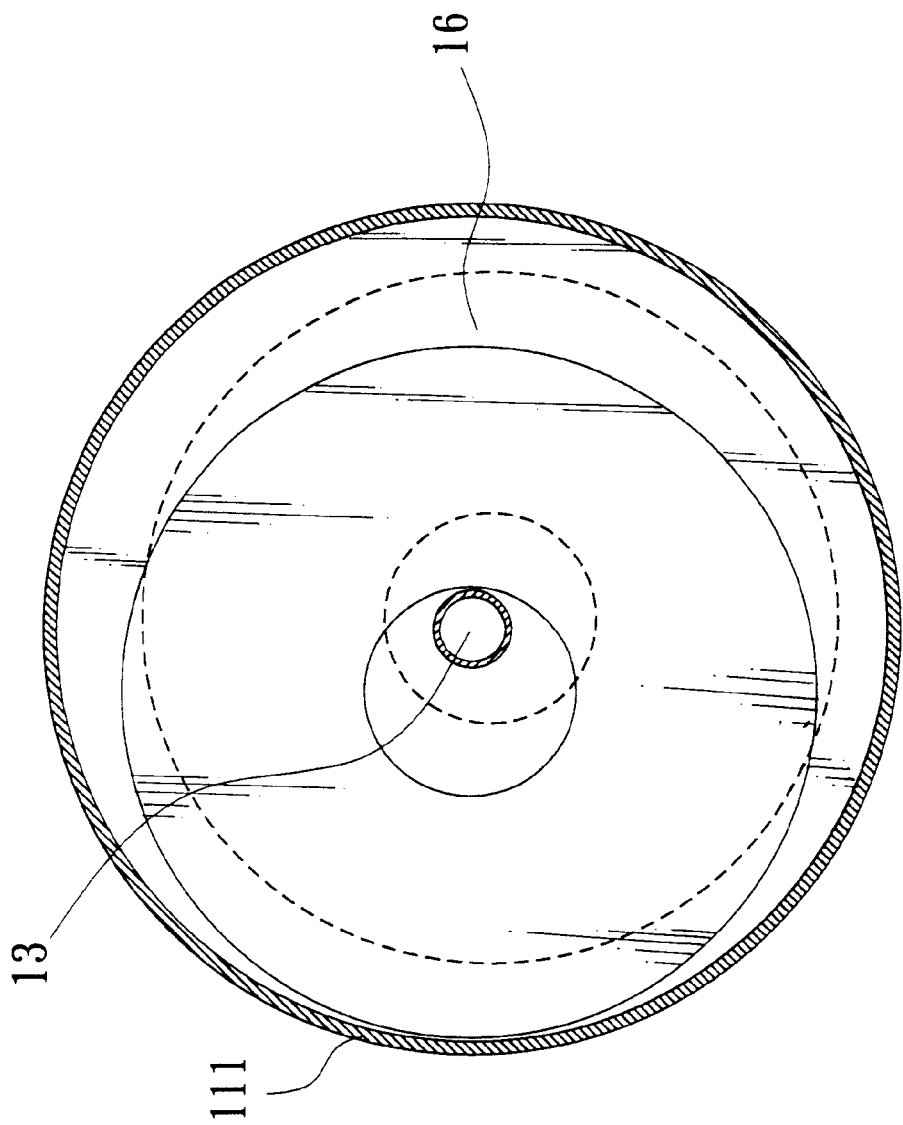

As shown in FIG. 8, the relative position of the weight object 18 and the sleeve 19 can be adjusted to generate different vibration level. Therefore, by modifying the displacement between them, the invention can be adjusted to produce the desired vibration without modifying or adding other components.

Effects of the Invention

As described before, the DC brushless voice-coil vibration motor proposed in the disclosure is a miniaturized motor. By modifying the structure of the stators and rotors inside the motor and the off-center design for the rotors, the disclosed invention can achieve the object of generating required vibration while having a miniaturized structure.

The invention directly uses the rotor as the weight object needed for generating vibration, avoiding the load of an additional weight as in the prior art. This can greatly increase the efficiency of the motor operation.

Furthermore, the invention can achieve to generate different vibration levels by simply changing the displacement of the weight object relative to the center of motor rather than redesigning the weight object for every desired vibration level of the vibration motor in the prior art.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A DC brushless voice-coil vibration motor comprising:
   a circuit board with a print circuit and at least two power input points therein;
   at least two inductance coils installed on said circuit board by winding wires in the radial direction and which generate magnetic fields when current flows therein;

a magnetic weight object with a plurality of coplanar magnetic poles installed on said inductance coils, a center of said magnetic weight object being radially displaced from the center of said vibration motor;

at least two magnetic bolts installed between said circuit board and said weight object and between said inductance coils and magnetized by magnetic contact with said magnetic weight object; and a controller installed on said circuit board and electrically connected to said inductance coils to make said inductance coils form magnetic poles.

2. The vibration motor of claim 1 further comprises a shell made of a non-magnetic material.

3. The vibration motor of claim 2, wherein said shell comprises a base and a top cover.

4. The vibration motor of claim 3, wherein an opening is formed at the bottom of the side surface of said top cover.

5. The vibration motor of claim 1, wherein a shaft is installed at the center of said circuit board.

6. The vibration motor of claim 1, wherein a protective ring is provided between said circuit board and said magnetic weight object.

7. The vibration motor of claim 6, wherein said protective ring is made of nonmagnetic material.

8. The vibration motor of claim 6, wherein said protective ring further comprises a first through hole and a second through hole for accommodating said inductance coils, a third through hole for accommodating said shaft, a fourth through hole for accommodating said controller, and a fifth through hole and a sixth through hole for accommodating said magnetic bolts.

9. The vibration motor of claim 1, wherein an electrical port is protruded from said print circuit and extended out from said opening on said shell, and said electrical port further comprises a plurality of power input points.

10. The vibration motor of claim 1, wherein the magnetic forces of said inductance coils are acted in the radial direction.

11. The vibration motor of claim 1, wherein said magnetic weight object generates a magnetic field in the axial direction.

12. The vibration motor of claim 1, wherein said controller is a micro-processing IC.

13. The vibration motor of claim 1, it further comprises a sleeve installed on said magnetic weight object, wherein the relative position of said magnetic weight object and said sleeve can be modified so that the center of said magnetic weight object and the center of said sleeve are on different axes.

* * * * *